(12) United States Patent
Lee et al.

(10) Patent No.: US 7,067,073 B2
(45) Date of Patent: Jun. 27, 2006

(54) YELLOW ZNS-BASED PHOSPHOR, PROCESS OF PREPARING THE SAME AND DISPLAY DEVICE USING THE PHOSPHOR

(75) Inventors: Sanghyuk Lee, Anyang (KR); Kyuchan Park, Suwon (KR); Sanghoon Shin, Suwon (KR); Yongchan You, Anyang (KR); Joayoung Jeong, Seongnam (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/368,341

(22) Filed: Feb. 20, 2003

(65) Prior Publication Data

US 2003/0197460 A1 Oct. 23, 2003

(30) Foreign Application Priority Data

Apr. 19, 2002 (KR) ................. 2002-21558

(51) Int. Cl.
*C09K 11/54* (2006.01)
*C09K 11/56* (2006.01)

(52) U.S. Cl. ................. 252/301.6 S; 313/582; 313/584; 313/467; 313/486

(58) Field of Classification Search ......... 252/301.6 S; 313/467, 486, 446

See application file for complete search history.

(56) References Cited

U.S. PATENT DOCUMENTS 4,377,769 A * 3/1983 Beatty et al. ................ 313/495
6,682,664 B1 * 1/2004 Chen et al. ........... 252/301.6 S
6,702,959 B1 * 3/2004 Fan et al. ............. 252/301.4 F

FOREIGN PATENT DOCUMENTS

JP 2-20590 1/1990
KR 2000-17450 3/2000

OTHER PUBLICATIONS

U.S. Appl. No. 10/368,385, filed Feb. 20, 2003, Lee et al., Samsung SDI Co., Ltd.

* cited by examiner

*Primary Examiner*—C. Melissa Koslow
(74) *Attorney, Agent, or Firm*—Stein, McEwen & Bui, LLP

(57) ABSTRACT

A yellow ZnS-based phosphor which has improved color coordinates and luminance for use in intermediate- and low-voltage display devices using improved activators and coactivators is a (ZnS: Mn, Cu) phosphor which has color coordinates (x, y) shifting to a yellow emission as the amount copper added as an activator is increased. The phosphor has enhanced luminance by adding a trivalent metal as a coactivator. Therefore, the (ZnS: Mn, Cu) phosphor can be advantageously utilized for various display applications including vacuum fluorescent displays (VFDs) and field emission displays (FEDs).

16 Claims, 2 Drawing Sheets

YELLOW ZNS-BASED PHOSPHOR, PROCESS OF PREPARING THE SAME AND DISPLAY DEVICE USING THE PHOSPHOR

CROSS-REFERENCE TO RELATED APPLICATION

This application claims the benefit of Korean Application No. 02-21558, filed Apr. 19, 2002 in the Korean Intellectual Property Office, the disclosure of which is incorporated herein by reference.

BACKGROUND OF THE INVENTION

1. Field of the Invention

The present invention relates to a yellow ZnS-based phosphor, a process of preparing the same and a display device using the phosphor. More particularly, the present invention relates to a yellow phosphor achieved by a ZnS-based host material having improved color coordinates and luminance for use in intermediate- and low-voltage display devices, and a process of preparing the same.

2. Description of the Related Art

Representative intermediate- and low-voltage display devices include vacuum fluorescent displays (VFDs) and field emission displays (FEDs). Like cathode ray tubes (CRTs), VFDs are self-radiating displays using phosphors, and are widely used, for example, as digital displays of household electric appliances and gauge panels of automobiles. Until recently, VFDs have mainly been used in low-capacity, small-sized products to simply display numbers, characters, and signs. However, VFDs are in use as high-density graphic image displays. In the near future, a full color VFD having a large display capacity will be commercially viable.

FEDs have received considerable attention as a next generation display device having the advantages of flat panel displays, such as liquid crystal displays (LCDs), and CRTs. Thus, a great deal of research on FEDs continues to be actively conducted. FEDs, which operate on the principle of field emission of electrons from microscopic tips, are known to be capable of overcoming the drawbacks of CRTs, such as excessive bulk and weight, and the drawbacks of LCDs, such as high manufacturing cost, limited size and viewing angle. Furthermore, since FEDs have various advantages such as a thin film form, low power consumption, low manufacturing cost, excellent temperature characteristics, and high-speed operation, FEDs have a wide variety of applications ranging from home televisions to industrial equipment and computers. In particular, FEDs are likely to be widely used in commercial applications such as notebook PCs, monitors, and televisions, like thin film transistor (TFT) LCDs.

A phosphor which is excitable by a low-velocity electron beam is required in VFDs or FEDs in order to emit light at a low anode drive voltage of less than 1 kV. Since such phosphors which are excitable by a low-velocity electron beam typically include sulfur in their host materials, these phosphors are generally referred to as sulfide-based phosphors. An example of sulfide-based phosphors are ZnS-based phosphors.

ZnS-based phosphors currently being used include a ZnS:Ag, Cl phosphor, a ZnS: Ag, Al phosphor, a ZnS:Cu, Al phosphor, a ZnS: Cu, Au, Al phosphor, and a ZnS: Mn phosphor. In particular, the ZnS: Mn phosphor is suitably used for intermediate- and low-voltage display devices. However, unlike the other ZnS-based phosphors using silver or copper as an activator, which are mostly blue-emitting phosphors, the ZnS: Mn phosphor using manganese emits yellow light. The ZnS: Mn phosphor emitting such characteristic color light leads to a wide range of applications. For light emitted by the ZnS: Mn phosphor, the x-coordinate is 0.55 and the y-coordinate is 0.43. Thus, the emission color is substantially orange, and therefore the ZnS: Mn phosphor is still open for improvement in luminance.

SUMMARY OF THE INVENTION

The present invention provides a ZnS-based phosphor having improved activators and coactivators to enhance color coordinates and luminance while not containing cadmium that is harmful to the human body.

The present invention also provides a process of preparing the ZnS-based phosphor.

According to an aspect of the present invention, there is provided an Mn, Cu activated ZnS-based (ZnS: Mn, Cu) phosphor with color coordinates (x, y) falling within a triangular region defined by (0.46, 0.54), (0.46, 0.45) and (0.55, 0.45) and having Cu as a second activator added to a ZnS-based phosphor having Mn as a first activator.

According to another aspect, the phosphor may further include a trivalent metal as a coactivator.

According to yet another aspect of the present invention, there is provided a process of preparing an Mn, Cu activated ZnS-based phosphor, the process including blending a ZnS host material having Mn as a first activator, Cu as a second activator, a trivalent metal as an optional coactivator with water and stirring to produce a mixture, drying and pulverizing the mixture to acquire fine particles, and sintering the fine particles at 800 to 1100° C. under a mild reducing atmosphere for 1 to 6 hours.

According to still another aspect of the present invention, there is provided an intermediate- and low-voltage display device using the phosphor.

BRIEF DESCRIPTION OF THE DRAWINGS

The above and/or other features and advantages of the present invention will become more apparent and more readily appreciated by describing in detail embodiments thereof with reference to the accompanying drawings in which.

DETAILED DESCRIPTION OF THE EMBODIMENTS

Figure 1:
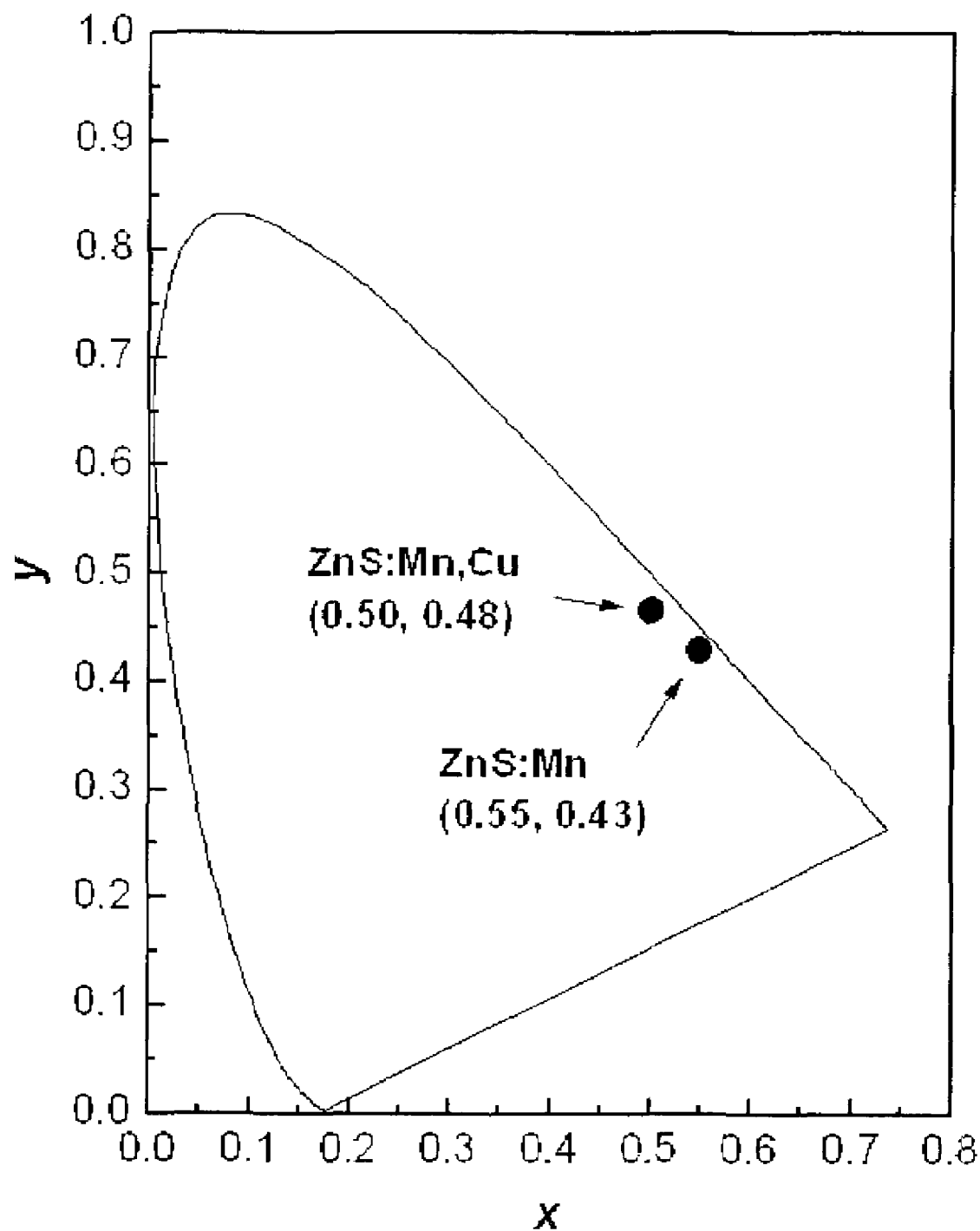
FIG. 1 is a graphical representation showing color coordinates of a conventional Mn activated ZnS-based (ZnS: Mn) phosphor and an Mn, Cu activated ZnS-based (ZnS: Mn, Cu) phosphor according to Example 1 of the present invention.

Reference will now be made in detail to the present embodiments of the present invention, examples of which are illustrated in the accompanying drawings and in specific Examples, wherein like reference numerals refer to the like elements throughout. The embodiments are described below in order to explain the present invention by referring to the figures and specific Examples.

In order to improve color purity and luminance of a conventional ZnS-based phosphor, and to control emission color, the present invention provides a highly advantageous yellow ZnS-based phosphor.

The CIE chromaticity coordinates of the conventional ZnS: Mn phosphor are x=0.55 and y=0.43, which corresponds to the orange emission color. However, in order to provide a yellowish hue, copper is added as a second activator, thereby improving the color purity. The addition of copper as a second activator to the conventional ZnS phosphor containing Mn as a first activator results in a change in the emission spectrum of Mn such that the emission wavelength of Mn becomes a little bit shorter. As a result, in the CIE chromaticity diagram, the x-coordinate is further decreased and the y-coordinate is further increased, thereby providing a yellow emission as compared to the conventional Mn activated ZnS phosphor. Thus, the Mn, Cu activated ZnS phosphor according to the present invention has color coordinates corresponding to a pure yellow emission.

An area where color coordinates (x, y) of the Mn, Cu activated ZnS phosphor according to an embodiment of the present invention are included is a triangular area defined by (0.46, 0.54), (0.46, 0.45) and (0.55, 0.45). While not required, the ZnS: Mn, Cu phosphor has color coordinates (x,y) within a triangular area defined by (0.48, 0.52), (0.48, 0.46) and (0.54, 0.46) according to an aspect of the invention.

In the ZnS phosphor according to an embodiment of the present invention, Mn is added as a first activator in an amount of 0.01 to 10 mol % per mole of ZnS, more preferably 0.1 to 1 mol %. If the amount of Mn added as the first activator is too small (i.e., not greater than 0.01 mol %), a desired effect is difficult to attain. Meanwhile, if the amount of Mn is greater than 10 mol %, undesired emission characteristics occur due to concentration quenching or coloring of host material.

In order to enhance the color purity of the ZnS phosphor according to an embodiment of the present invention, Cu is added as a second activator in an amount of $1 \times 10^{-5}$ to $1 \times 10^{-1}$ mol % per mole of ZnS, and preferably $1 \times 10^{-4}$ to $1 \times 10^{-2}$ mol %. If the amount of Cu added as the second activator is too small, (i.e., not greater than $1 \times 10^{-5}$ mol %), a desired effect is difficult to attain. Meanwhile, if the amount of Mn is greater than $1 \times 10^{-1}$ mol %, there occurs an undesirable deterioration in the luminance due to concentration quenching or a change in color coordinates.

Sintering, which is performed in the manufacture of the ZnS phosphor used as a host material in the present invention, allows some Zn ions in the host material to be reduced into metallic Zn, which does not bond with sulfur ions to form ZnS. Such an insufficiency of Zn ions may result in the deterioration of emission characteristics, for example, luminance. In the present invention, the coactivators having the trivalent metals compensate for the insufficient Zn ions, thereby preventing the deterioration of emission characteristics while improving luminance.

In the present invention, the trivalent metals used as the coactivators have conductivities of 0.01 to 0.377 cm/Ω, and ion radii of 51 to 96 pm, so that they can easily substitute for Zn in the host material having an ion radius of 73 pm, and take the place of the insufficient ionic Zn in sintering. Examples of the trivalent metals include, but are not limited to, aluminum (Al), dysprosium (Dy), erbium (Er), samarium (Sm), bismuth (Bi) and lanthanum (La). The preferable metals among these are Al, Sm and Dy.

According to an embodiment, the trivalent metal is added as a coactivator to the ZnS phosphor according to the present invention in an amount of 0.01 to 10 mol % per mole of ZnS, and preferably 0.05 to 3 mol %. If the amount of the trivalent metal added is not greater than 0.01 mol %, the luminance increasing effect is not sufficient. Meanwhile, if the amount of the trivalent metal is greater than 10 mol %, there occurs an undesirable deterioration in the luminance due to concentration quenching.

The ZnS phosphor according to an aspect of the present invention is prepared by blending a ZnS host material having Mn as a first activator, Cu as a second activator, and a trivalent metal as an optional coactivator with water and stirring to give a mixture, drying and pulverizing the mixture in an alumina mortar to acquire fine particles, and sintering the fine particles at 800 to 1100° C. under a mild reducing atmosphere for 1 to 6 hours. The sintering temperature is preferably in the range of 850 to 1000° C., but other ranges may be used.

In the above-described process, the Mn and the Cu are used as the first and second activators, respectively, but are not specifically limited in their forms. Therefore, the Mn and Cu may be elemental, hydroxide or salt, such as nitrate, sulfate or chlorate, and preferably are in the form of sulfate.

Also, the trivalent metal added as a coactivator is not specifically limited in its form and may be elemental, hydroxide or salt.

If necessary, various fluxes (such as halide), can be used. Examples thereof include, but are not limited to, barium chloride, sodium iodide, ammonium iodide, potassium iodide, ammonium fluoride, aluminum fluoride, cesium chloride and magnesium chloride.

According to another aspect of the present invention, there are provided intermediate- and low-voltage display devices, such as vacuum fluorescent displays (VFDs) and field emission displays (FEDs), using the phosphor of the present invention.

Figure 2:
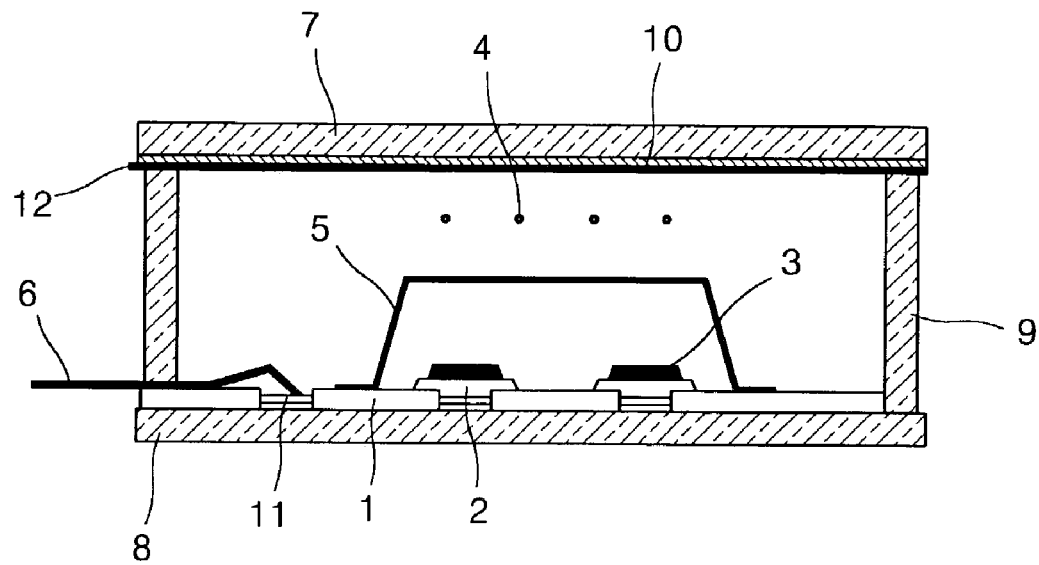
FIG. 2 is a cross-sectional view of a vacuum fluorescent display (VFD) using the phosphor of the present invention.

FIG. 2 shows the structure of a VFD in which an insulator layer 1, an anode 2, phosphors 3, filaments 4, a grid 5 and a lead output terminal 6 are provided in a vacuum envelope. A transparent conductive layer 10, a silver wire 11 and a seal glass 12 are also in the VFD. The VFD is enclosed by a faceplate 7, a backplate 8 and sideplates 9, made of glass, and is basically configured such that the grid 5, the insulator layer 1 and the anode 2 are formed between the frontplate 7 and the backplate 8 by printing and heating processes. The frontplate 7 serves to allow the envelope to be kept at a vacuum state and prevents static electricity from being externally applied. The phosphors 3 for the VFD emit light by electrons emitted from the filaments 4 as electron sources in a vacuum state. The filaments 4 are generally formed by coating barium oxide on tungsten to thus emit thermal electrons when they are heated due to applied power. The lead output terminal 6 is used to supply the power to the filaments 4, the grid 1 and the anode 7, and is led outside the vacuum envelope to a power source (not shown). One of the phosphors 3 comprises the phosphor of the present invention.

Figure 3:
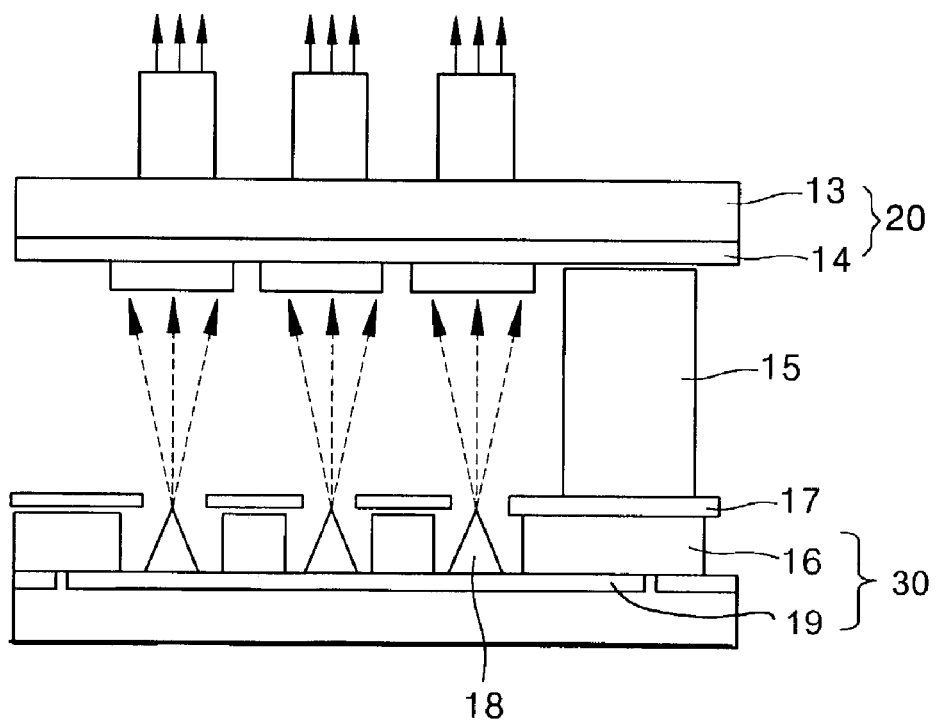
FIG. 3 is a cross-sectional view of a portion of a field emission display (FED) using the phosphor of the present invention.

FIG. 3 is a cross-sectional view of a portion of a general field emission display (FED). As shown in FIG. 3, the FED Includes an anode 20, a cathode 30 and a small vacuum gap maintained by a spacer 15 interposed therebetween within a vacuum envelope. In FIG. 3, a gate insulator 16 and an emitter 18, respectively are also used in the FED. The anode 20 has a glass plate 13 and an indium tin oxide (ITO) plate 14. The cathode 30 has a cathode plate 19 and a gate 17, the anode 20 and cathode 30 being spaced apart from each other by the vacuum gap. That is to say, the anode 20 is coated with phosphors and is disposed at the upper portion of the vacuum gap, and the cathode 30 is disposed at the lower portion of the gap. Row and column electrodes arranged on the cathode 30 allow field emitter arrays (FEAs) to be matrix-addressed to emit electrons from the FEAs during a time period in which a voltage is applied to the gate 17. The electrons are accelerated by an anode voltage toward the phosphors coated on the anode 20 via the vacuum gap and collide with pixels of the phosphors, exciting them to emit light. One of the phosphors comprises the phosphor of the present invention.

Hereinafter, embodiments of the present invention will be described in detail using the below Examples. However, it is understood that the scope of this invention is not restricted to the described examples of the embodiments.

EXAMPLE 1

1 mol of ZnS, 0.4 mol % of $MnSO_4$ and 0.005 mol % of Cu were put into a beaker, mixed with water, stirred, and dried in a dryer. The dried mixture was put into an alumina mortar and ground to obtain fine particles. The obtained fine particles were sintered at 950° C. for 3 hours to give 80 g of a ZnS: Mn, Cu phosphor.

FIG. 1 is a CIE chromaticity diagram of the obtained phosphor. As shown in FIG. 1, the CIE chromaticity coordinates of the ZnS: Mn, Cu phosphor according to Example 1 of the present invention are x=0.50 and y=0.48, whereas the CIE chromaticity coordinates of the conventional ZnS: Mn phosphor are x=0.55 and y=0.43. Thus, in an example of the present invention, the x-coordinate is smaller and the y-coordinate is larger than the conventional phosphor, thereby providing a pure yellow emission.

EXAMPLE 2

1 mol of ZnS, 0.4 mol % of $MnSO_4$, 0.005 mol % of Cu and 1.3 mol % of $Al(OH)_3$ were put into a beaker, mixed with water, stirred, and dried in a dryer. The dried mixture was put into an alumina mortar and ground to obtain fine particles. The obtained fine particles were sintered at 950° C. for 3 hours to give 80 g of a ZnS:Mn, Cu, Al phosphor.

The luminance and color coordinates of the obtained phosphor were measured and the results thereof are listed in Table 1.

EXAMPLE 3

The same procedure as in Example 2 was carried out except that 0.1 mol % of Dy was used as a coactivator instead of $Al(OH)_3$, to obtain 80 g of ZnS: Mn, Cu, Dy phosphor.

The luminance and color coordinates of the obtained phosphor were measured and the results thereof are listed in Table 1.

EXAMPLE 4

The same procedure as in Example 2 was carried out except that 0.5 mol % of Er was used as a coactivator instead of $Al(OH)_3$, to obtain 81 g of ZnS: Mn, Cu, Er phosphor.

The luminance and color coordinates of the obtained phosphor were measured and the results thereof are listed in Table 1.

EXAMPLE 5

The same procedure as in Example 2 was carried out except that 1.3 mol % of Sm was used as a coactivator instead of $Al(OH)_3$, to obtain 81 g of ZnS: Mn, Cu, Sm phosphor.

The luminance and color coordinates of the obtained phosphor were measured and the results thereof are listed in Table 1.

EXAMPLE 6

The same procedure as in Example 2 was carried out except that 1.7 mol % of Bi was used as a coactivator instead of $Al(OH)_3$, to obtain 80 g of ZnS: Mn, Cu, Bi phosphor.

The luminance and color coordinates of the obtained phosphor were measured and the results thereof are listed in Table 1.

EXAMPLE 7

The same procedure as in Example 1 was carried out except that 0.003 mol % of La was used as a coactivator instead of $Al(OH)_3$ and 1 mol % of $NH_4F$ was used as a flux, to obtain 80 g of ZnS: Mn, Cu, La phosphor.

The luminance and color coordinates of the obtained phosphor were measured and the results thereof are listed in Table 1.

COMPARATIVE EXAMPLE 1

The same procedure as in Example 1 was carried out except that $Al(OH)_3$ and Cu were not used, to obtain 80 g of ZnS: Mn phosphor.

The luminance and color coordinates of the obtained phosphor were measured and the results thereof are listed in Table 1.

The luminance of each of various phosphors according to Examples 1–7 and Comparative Example was measured by 365 nm excitation.

TABLE 1

|  | Color coordinates | Relative luminance increasing ratio (%) 365 nm PL |
|---|---|---|
| Comparative Example 1 | x = 0.55, y = 0.43 | 100 |
| Example 1 | x = 0.50, y = 0.48 | 105 |
| Example 2 | x = 0.51, y = 0.48 | 180.2 |
| Example 3 | x = 0.50, y = 0.47 | 181.6 |
| Example 4 | x = 0.50, y = 0.49 | 179.5 |
| Example 5 | x = 0.50, y = 0.47 | 176.5 |
| Example 6 | x = 0.50, y = 0.48 | 184.3 |
| Example 7 | x = 0.50, y = 0.48 | 184.6 |

As shown in Table 1, while providing a yellow emission color, the luminance of the ZnS phosphor according to the present invention containing Mn as a first activator is improved by adding copper as a second activator and optionally adding a trivalent metal, such as Al, Dy, Er, Sm, Bi or La, as a coactivator, to the ZnS phosphor.

As described above, the ZnS-based phosphor according to the present invention containing Mn as a first activator, Cu as a second activator, and optionally a trivalent metal as a coactivator, has enhanced color coordinates and luminance while not containing cadmium, which is harmful to the human body.

Therefore, the phosphor according to the present invention can be advantageously utilized for various display applications including vacuum fluorescent displays (VFDs) and field emission displays (FEDs).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A phosphor comprising a (ZnS: Mn, Cu) phosphor having color coordinates (x, y) within a triangular region defined by (0.46, 0.54), (0.46, 0.45) and (0.50, 0.45), corresponding to a yellow emission color, and using the Mn as a first activator and the Cu as a second activator, and further comprising a coactivator, wherein the coactivator is a trivalent metal and is one of aluminum (Al), dysprosium (Dy), erbium (Er). samarium (Sm), bismuth (Bi) and lanthanum (La).

2. The phosphor according to claim 1, wherein the color coordinates (x, y) are within a triangular region defined by (0. 48, 0.52), (0.48, 0.46) and (0.50, 0.46).

3. The phosphor according to claim 1, wherein the Mn is added as the first activator in an amount of 0.01 to 10 mol% per mole of ZnS.

4. The phosphor according to claim 1, wherein the Mn is added as the first activator in an amount of 0.1 to 1 mol% per mole of ZnS.

5. The phosphor according to claim 1, wherein the Cu is added as the second activator in an amount of $1 \times 10^{-5}$ to $1 \times 10^-$ mol% per mole of ZnS.

6. A phosphor comprising a (ZnS: Mn, Cu) phosphor having color coordinates (x, y) within a triangular region defined by (0.46, 0.54), (0.46, 0.45) and (0.50, 0.45), corresponding to a yellow emission color, and using the Mn as a first activator and the Cu as a second activator, wherein the Cu is added as the second activator in an amount of $1 \times 10^{-4}$ to $1 \times 10^-$ mol% per mole of ZnS.

7. A phosphor comprising a (ZnS: Mn, Cu) phosphor having color coordinates (x, y) within a triangular region defined by (0.46, 0.54), (0.46, 0.45) and (0.50, 0.45), corresponding to a yellow emission color, and using the Mn as a first activator and the Cu as a second activator, and further comprising a coactivator, wherein the coactivator is a trivalent metal and is added in an amount of 0.01 to 10 mol% per mole of ZnS.

8. A process of preparing a ZnS: Mn, Cu phosphor, comprising:

blending a ZnS host material having Mn as a first activator and Cu as a second activator with water, and stirring to produce a mixture;

drying and pulverizing the mixture to acquire fine particles; and sintering the fine particles at 800 to 1100° C. under a mild reducing atmosphere for 1 to 6 hours.

9. The process according to claim 8, wherein the sintering temperature is at or between 850 and 1000° C.

10. The process according to claim 8, wherein, in the blending the ZnS host material, the ZnS host material further comprises a trivalent metal as a coactivator.

11. A display device comprising:

a vacuum envelope within a container; and an electron source and a phosphor layer disposed in the vacuum envelope, wherein the phosphor layer includes a phosphor into which electrons emitted from the electron source collide to emit light, the phosphor being a ZnS: Mn, Cu phosphor having color coordinates (x, y) within a triangular region defined by (0.46, 0.54), (0.46, 0.45) and (0.55, 0.45), corresponding to a yellow emission color, and using Mn as a first activator and Cu as a second activator, wherein the ZnS: Mn, Cu phosphor further uses a trivalent metal as a coactivator.

12. The display device according to claim 11, wherein the trivalent metal added as the coactivator is one of aluminum (Al), dysprosium (Dy), erbium (Er), samarium (Sm), bismuth (Bi) and lanthanum (La).

13. The display device according to claim 11, wherein the trivalent metal is added as the coactivator in an amount of 0.01 to 10 mol% per mole of ZnS.

14. The display device according to claim 11, wherein the display apparatus comprises a field emission display.

15. The display device according to claim 11, wherein the display apparatus comprises a vacuum fluorescent display.

16. A phosphor comprising a (ZnS: Mn, Cu) phosphor with a yellow emission color using the Mn as a first activator and the Cu as a second activator, and further comprising a trivalent metal as a coactivator.

* * * * *

UNITED STATES PATENT AND TRADEMARK OFFICE
CERTIFICATE OF CORRECTION

PATENT NO. : 7,067,073 B2 Page 1 of 1
APPLICATION NO. : 10/368341
DATED : June 27, 2006
INVENTOR(S) : Sanghyuk Lee et al.

It is certified that error appears in the above-identified patent and that said Letters Patent is hereby corrected as shown below:

Column 7, line 19, change "." to --,--

Column 7, line 32, change "1 X 10$^-$" to -- 1 x 10$^{-1}$ --

Column 7, line 39, change "1 X 10$^-$" to -- 1 x 10$^{-2}$ --

Signed and Sealed this

Twelfth Day of December, 2006

JON W. DUDAS
*Director of the United States Patent and Trademark Office*